United States Patent
Guthrie et al.

[11] Patent Number: 5,887,144
[45] Date of Patent: Mar. 23, 1999

[54] METHOD AND SYSTEM FOR INCREASING THE LOAD AND EXPANSION CAPABILITIES OF A BUS THROUGH THE USE OF IN-LINE SWITCHES

[75] Inventors: Guy Lynn Guthrie, Austin; Danny Marvin Neal, Round Rock, both of Tex.; Richard Allen Kelley, Apex, N.C.

[73] Assignee: International Business Machines Corp., Armonk, N.Y.

[21] Appl. No.: 753,116

[22] Filed: Nov. 20, 1996

[51] Int. Cl.$^6$ ........................................... G06F 13/00
[52] U.S. Cl. .................... 395/281; 395/311; 395/306; 395/309
[58] Field of Search ................... 395/306–309, 395/311–312, 822, 858, 281, 287, 293

[56] References Cited

U.S. PATENT DOCUMENTS

| | | | |
|---|---|---|---|
| 5,248,905 | 9/1993 | Kuo | 327/203 |
| 5,317,697 | 5/1994 | Husak et al. | 395/283 |
| 5,325,491 | 6/1994 | Fasig | 395/281 |
| 5,353,243 | 10/1994 | Read et al. | 364/578 |
| 5,379,384 | 1/1995 | Solomon | 395/308 |
| 5,392,407 | 2/1995 | Heil et al. | 395/293 |
| 5,396,596 | 3/1995 | Hashemi et al. | 711/113 |
| 5,440,755 | 8/1995 | Harwer et al. | 395/281 |
| 5,448,704 | 9/1995 | Spaniol et al. | 395/310 |
| 5,455,915 | 10/1995 | Coke | 395/293 |
| 5,469,082 | 11/1995 | Bullinger et al. | 326/81 |
| 5,471,590 | 11/1995 | Melo et al. | 395/288 |
| 5,481,679 | 1/1996 | Higaki et al. | 395/308 |
| 5,502,824 | 3/1996 | Heil | 395/293 |
| 5,506,973 | 4/1996 | Okazawa et al. | 395/306 |
| 5,511,229 | 4/1996 | Tsujimoto | 395/851 |
| 5,577,215 | 11/1996 | Lee et al. | 395/311 |
| 5,684,966 | 11/1997 | Gafford et al. | 395/309 |

*Primary Examiner*—Meng-Ai T. An
*Assistant Examiner*—Sumato Lefkowitz
*Attorney, Agent, or Firm*—Richard A. Henkler

[57] ABSTRACT

A method and system for expanding the load capabilities of a bus, such as the PCI bus. The system includes a primary bus, a plurality of secondary buses for connecting additional devices, a plurality of in-line switches, an arbiter, and control logic means. The plurality of in-line switches are used for connecting the primary bus to a corresponding one of the secondary buses, each one of the switches having an enable line for receiving a signal to enable or disable the switch. The arbiter is used for receiving requests for control of the primary bus, and for selecting one of the requests as a master for the control. The control logic means is used for enabling and disabling each of the switches, via the corresponding enable line, for connection or disconnection to the primary bus. The control logic means includes means, coupled to the arbiter, for gaining control over the primary bus prior to granting control to the master, and means for transmitting, during control over the primary bus, an enable signal to the switches corresponding to the secondary buses desired to be connected to the primary bus.

10 Claims, 4 Drawing Sheets

METHOD AND SYSTEM FOR INCREASING THE LOAD AND EXPANSION CAPABILITIES OF A BUS THROUGH THE USE OF IN-LINE SWITCHES

BACKGROUND

1. Field of the Present Invention

In general, the present invention relates to data processing systems, and more particularly, to methods and apparatuses that increase the load and expansion capabilities of the bus for such systems.

2. History of Related Art

Historically, personal computers have used a single bus to transfer data between different internal components of the system. These buses have been typically designed as either an Industry Standard Association (ISA) bus or an Expanded Industry Standard Association (EISA) bus. The ISA bus is a 16 bit data bus while the EISA bus is a 32 bit data bus. The bus widths and the rate at which each of these buses is capable of operating have been found limiting. Consequently, a number of attempts to increase bus speed have arisen.

One recently implemented method of increasing bus speed, is to provide an additional, so called, "local bus" which is more closely associated with the central processor then either of the above-mentioned buses, and which is capable of running at speeds that more closely approximate the speed at which the processor itself runs. Those system components which require faster operation than has been available using the slower buses (such as an output display card for an output display device) are joined to this faster or local bus. The slower EISA or ISA bus is continued in essentially unchanged form, and those components which are able to tolerate longer access times are associated therewith. Although the theory behind using a local bus is good, many local bus designs have created conflicts in accessing components thereon; which actually results in slowing the operation of the computer.

The PCI Special Interest Group (PCISIG) has designed a new local bus which may be associated in a computer system, having an Intel, PowerPC, or other processors, with other buses such as an EISA bus or ISA bus (which are hereinafter referred to broadly as standard expansion buses). This new local bus provides faster throughput of data for selected components of the system. This new bus is referred to as the "Peripheral Component Interconnect" (PCI) bus.

A computer system using this PCI bus includes in addition to the physical PCI bus a PCI host bridge circuit which controls the transfer of data among the PCI bus, the central processing unit, and main memory. The PCI host bridge circuit is arranged to control the transfer of data between the primary PCI bus and the system bus.

The PCI local bus specification, version 2.1, defines the electrical characteristics of the PCI bus. Specifically, a bus loading of 10 loads is allowed (with the assumed capacitive loading, allowed timing budget, and bus timing, definitions). Loads are calculated as follows: (1) each device that is physically soldered to the bus counts as a single load; and (2) each slot coupled to the bus counts as two loads. Conformance to the maximum loading requirements, as indicated above, results in a maximum number of four slots (8 loads) with the remaining two loads for soldered components such as a Host bridge.

It would be a distinct advantage, however, to have a method and system that would increase the maximum number of slots or soldered components that could be coupled to the bus, while conforming to the maximum loading requirements thereof. The present invention provides such a method and system.

SUMMARY OF THE PRESENT INVENTION

In one aspect, the present invention is an apparatus for increasing the load capabilities of a bus. The apparatus includes a primary Peripheral Component Interconnect bus, and a plurality of secondary Peripheral Component Interconnect buses. The apparatus further includes a plurality of switches for connecting the primary Peripheral Component Interconnect bus to a corresponding one of the secondary Peripheral Component Interconnect buses, each one of the switches having an enable line for receiving a signal to enable or disable the switch.

The apparatus also includes an arbiter for receiving requests for control of the primary Peripheral Component Interconnect bus, and for selecting one of the requests as a master for the control. In addition, the apparatus includes control logic means for enabling and disabling each of the switches, via the corresponding enable line, for connection or disconnection to the primary Peripheral Component Interconnect bus. The control logic means includes means, coupled to the arbiter, for gaining control over the primary Peripheral Component Interconnect bus prior to granting control to the master. The control logic means also includes means for transmitting, during control over the primary Peripheral Component Interconnect bus, an enable signal to the switches corresponding to the secondary buses desired to be connected to the primary Peripheral Component Interconnect bus.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
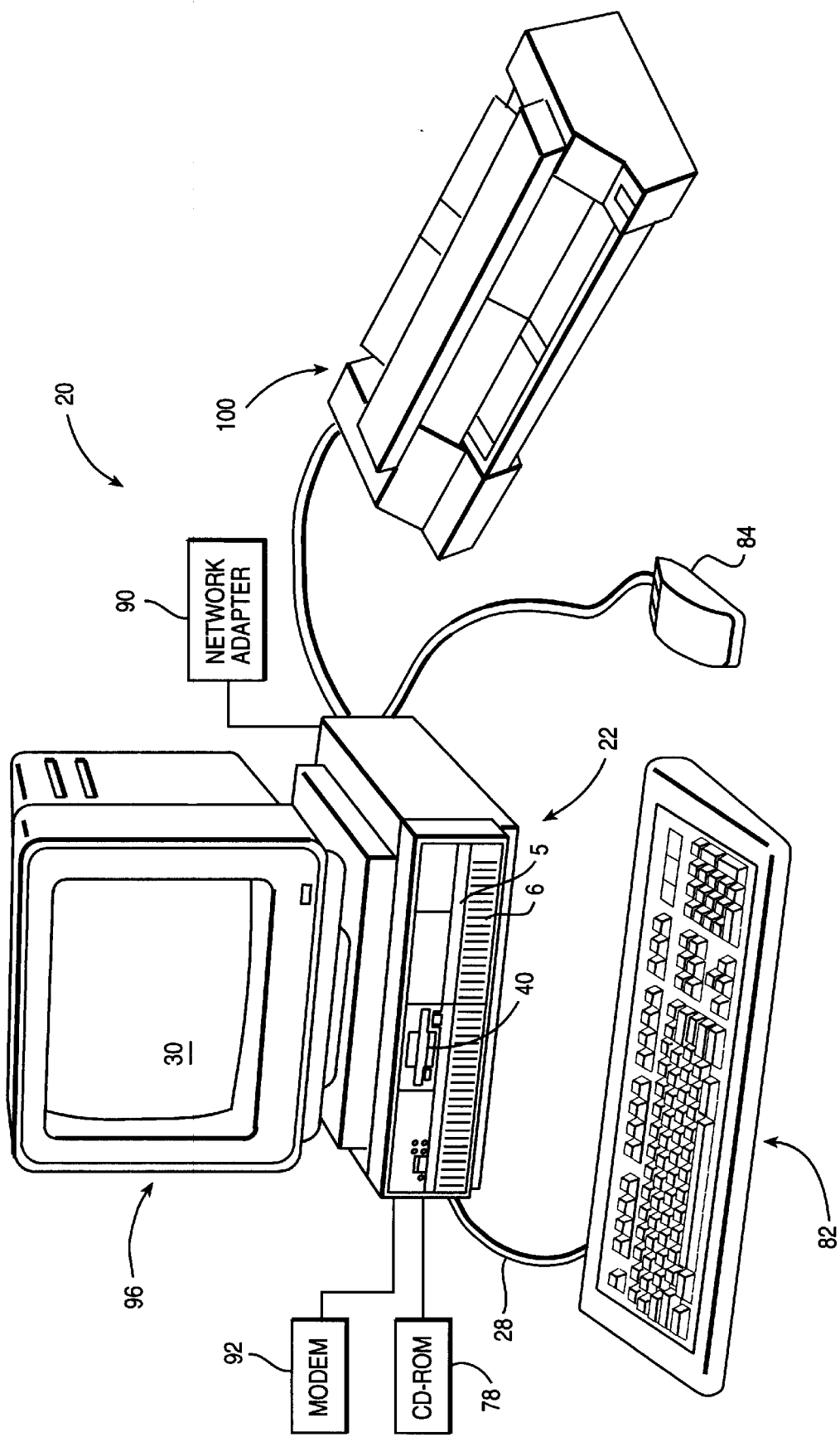
FIG. 1 is a data processing system in which the present invention can be implemented.

Reference now being made to FIG. 1, a data processing system 20 is shown in which the present invention can be implemented. The data processing system 20 includes processor 22, keyboard 82, and display 96. Keyboard 82 is coupled to processor 22 by a cable 28. Display 96 includes display screen 30, which may be implemented using a cather ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Figure 2:
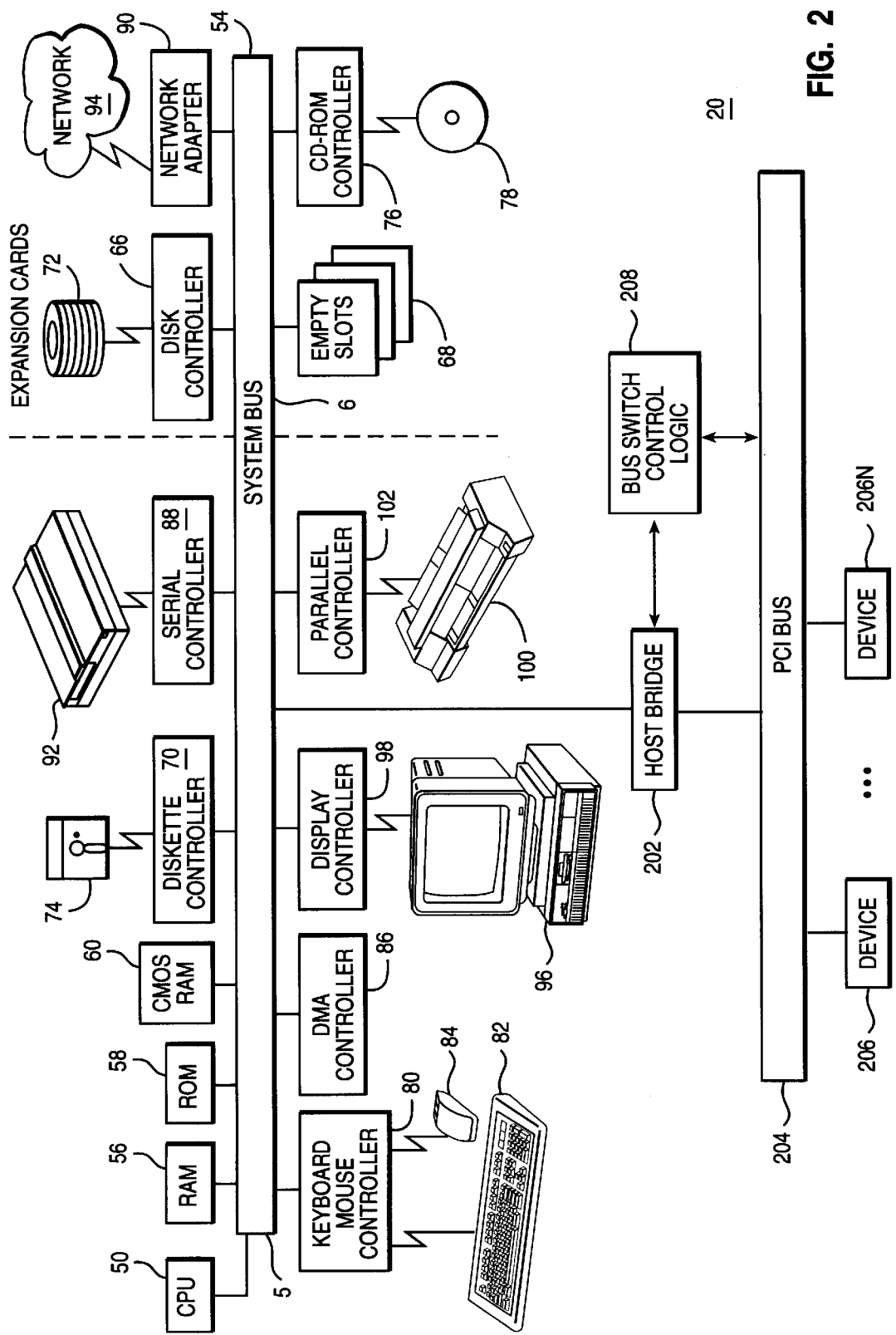
FIG. 2 is a high level block diagram illustrating selected components that can be included in the data processing system of FIG. 1 according to the teachings of the present invention.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button.

Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

As shown in FIG. 2, system bus 5 is connected to a PCI host bridge 202 for communication with PCI bus 204. As previously stated, PCI bus 204 is used for devices 206–206N which require fast communication response times.

It should be noted, and those of ordinary skill in the relevant art will readily recognize, that although many of devices are connected to system bus 5, any one of these devices could alternatively be connected to the PCI bus 204 (or PCI buses), or a standard expansion bus (e.g. ISA or EISA). In example, an additional bridge circuit could be attached to the system bus 5 or Primary PCI bus 204 to create a standard expansion bus for connection of the devices.

Host bridge 202 facilitates communication between PCI bus 204 and system bus 5. Devices 206–206N are coupled to PCI bus 204. Bus Switch Control Logic 208 is coupled to Host Bridge 202 and PCI bus 204, and provides control over the PCI bus 204 for increased loading thereof. More specifically, the load capabilities of PCI bus 204 are expanded via the use of in-line Switch Modules (not shown) in combination with the Bus Switch Control Logic 208 as explained hereinafter in connection with FIG. 3.

Figure 3:
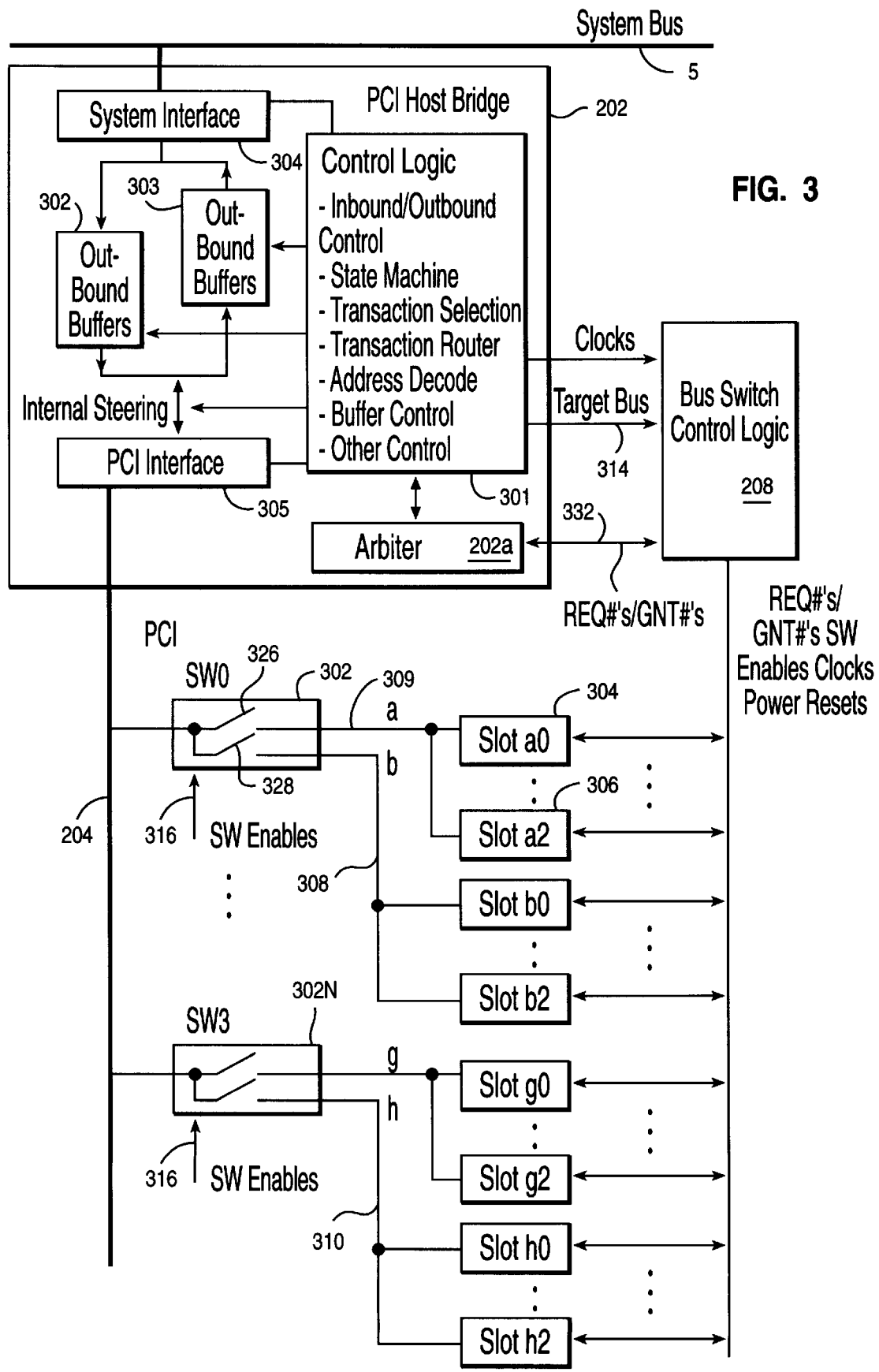
FIG. 3 is a schematic diagram illustrating in greater detail the configuration of PCI bus of FIG. 2 for slot expansion according to the teachings of the present invention.

Reference now being made to FIG. 3, a schematic diagram is shown illustrating in greater detail the configuration of PCI bus 204 of FIG. 2 for slot expansion according to the teachings of the present invention. The representation of FIG. 3 assumes that maximum loading of the PCI bus 204 is desired. It should be noted, therefore, and those of ordinary skill in the relevant art will readily recognize, that the teachings of the present invention are not limited to such an embodiment and are equally applicable to other combinations of switch modules and slots in which maximum loading is not so desired.

As shown in FIG. 3, in-line Switch Modules 302-302N are coupled to PCI bus 204. In-line Switch Module 302 is representative of switch modules 302A–302N, and therefore, the explanation provided therewith is equally applicable to switch modules 302A–302N. In-line Switch Module 302 includes two sets of switches as indicated by designations 326 and 328. Switches 326 and 328 are used for switching the appropriate PCI bus 204 signal lines, and when closed create two physically separate PCI compliant bus extensions (secondary PCI buses), as represented by designations "a" 309 and "b" 308, respectively. In the preferred embodiment in which maximum loading is desired, a total of three such switch modules are coupled to the PCI bus 204. One skilled in the relevant art, however, will readily recognize that the number of switch modules required for any particular application is dependent upon the number of switches contained therein.

These PCI bus extensions 308 and 309 can be coupled with either a slot or soldered component depending upon the desired configuration. In this particular embodiment, three slots are coupled to each PCI bus extension as illustrated by slots 304 (slots A0–A2) and 306 (slots B0–B2) for PCI bus extensions "a" 309 and "b" 308, respectively. Each of the slots are coupled to individual, clock signals, Power, Switch Enables signals, Grant/Request (GNT/REQ) 332, and reset signals.

As the in-line Switch Modules 302–302N are switched on and off, the PCI bus 204 is shielded from the load effects resulting therefrom via the Bus Switch Control Logic 208 and Arbiter 202A of Host Bridge 202. In other words, as a set of switches, such as Switches 326 and 328, are "opened", as determined by the Bus Switch Control Logic 208 and corresponding Switch enable line 316, the respective PCI bus extensions are effectively isolated from PCI bus 204.

This isolation is a direct result of the high impedance of the switches 302-N from such an open state. In contrast, when the switches 302-N are "closed", as determined by the Bus Switch Control Logic 208 and corresponding SW enable 316 line, the respective PCI bus extensions appear as though they are an integrated portion of PCI bus 204. In the preferred embodiment of the present invention, the Switch Modules 302-N have switches which can toggle between the open and close states in a few PCI clock cycles.

In general, Arbiter 202A in conjunction with Bus Switch Control Logic 208 control access to/from PCI bus 204 via any one of the in-line Switch Modules 302–302N. Thus, any communication with a device coupled to PCI bus 204, via one of the in-line Switch Modules 302–302N, is directed through the Arbiter 202A and Bus Switch Control Logic 208 as explained hereinafter.

Generally speaking, Arbiter 202A provides arbitration for control over PCI bus 204. In the preferred embodiment of the present invention, Arbiter 202A provides arbitration for up to 25 arbiters (e.g. 24 adapters and Host Bridge 202). The winning arbiter, as determined by Arbiter 202A, is referred to hereinafter as the master.

Bus Switch Control Logic 208 is coupled to Arbiter 202A via REQ/GNT lines 332, and encoded Target Bus lines 314. The REQ/GNT lines 332 are also used for receiving momentary control (on the order of a few PCI clock cycles) of the PCI bus 204 to enable or disable the in-line Switch Modules 302–302N via their respective SW Enable lines 316–316N. Arbiter 202A and Bus Switch Control Logic 208 use SW Enable lines 316 to control which one of the In-line Switch Modules 302-N to enable or disable.

Each one of the Slots 304, and 306 include individual Request and Grant (REQ/GNT) lines 332 for requesting and receiving permission to control PCI bus 204. As noted in FIG. 3, each of these REQ/GNT lines pass through the Bus Switch Control Logic 208 to Arbiter 202A.

The interaction between the Arbiter 202A and Bus Switch Control Logic 208 is explained in detail by the following examples.

As previously explained, the Bus Switch Control Logic 208 is provided with the REQ/GNT lines 332 (separate request and grant lines) from the Arbiter 202A which are then routed to the various PCI slots (e.g. slot A0 304 and slot A2 306). The Arbiter 202A provides arbitration for each of the PCI slots such that the slots and the Host Bridge 202 appear as if they all resided on the same logical bus.

Prior to passing a GNT# signal from the Arbiter 202A to a new wining arbiter and while there is no activity on the bus, the Bus Switch Control Logic 208 first opens and closes the appropriate switches, thus, connecting and disconnecting the appropriate secondary PCI buses. In this manner, the Bus Switch Control Logic 208 performs the role of an agent for the wining arbiter, in other words, it acts as if it owns the bus 204 momentarily prior to passing the GNT# signal to the designated device.

The above action of the Bus Switch Control Logic 208, is fully supported by the of the PCI architecture, as currently defined in version 2.1, in that the GNT# will be passed to the winning arbiter in time for the winning arbiter to gain its control of the bus.

The Control Logic 301, the Arbiter 202A, and the Bus Switch Control Logic 208, operate in conjunction with one another in order to determine and configure the state of the in-line switches 302-N. The state of the switches 302-N is based on where the target of the current transaction is located when the PCI bus 204 is granted by the Host Bridge 202.

For example, if the Host Bridge 202 decides to perform an out-bound transaction on the PCI bus 204, then the Host Bridge 202 activates its REQ# signal and arbitrates for the PCI bus 204. Thereafter, the Control Logic 301 determines, based on the address of the out-bound transaction and the address assigned to the Host Bridge 202, where the target of the transaction is located. If the Host Bridge 202 wins the bus arbitration, then the previous owner of the PCI bus 204 deactivates its GNT# line, and the Host Bridge 202 is granted the PCI bus 204. The GNT# signal is then passed to the Bus Switch Control Logic 208 via REQ/GNT lines 332.

After the previous bus owner has completed its transaction (GNT# deactivated and its latency timer expired), the Bus Switch Control Logic 208 delays passing the Host Bridge 202 GNT# signal to the Host Bridge 202. This delay is used by the Bus Switch Control Logic 208 to open the in-line switches 302-N to the previous bus owner, and close the appropriate in-line switches 302-N to the target of the transaction.

As can be seen from FIG. 3, the REQ#/GNT# lines 332 are passed through the Bus Switch Control Logic 208 in order for the Bus Switch Control Logic 208 to determine which devices are requesting and being granted the PCI bus 204. The Arbiter 202A and the Bus Switch Control Logic 208 work in conjunction to provide the necessary control to enable the appropriate in-line switches 302-N, thus connecting, the proper slot to the PCI bus 204. The address decode in the Control Logic 301 is also used to determine which target is to be selected when the Host Bridge 202 is the wining arbiter (master).

The following description is an example of a sequence used by the preferred embodiment of the present invention for connecting an appropriate slot (e.g. 304 and 306) to the PCI bus 204. For the moment, assume that the adapter (not shown) residing in slot H0, on secondary PCI are bus H 310, is the current owner of the PCI bus 204, and performing transfers to system memory (not shown).

Consequently, in-line switch 302N to secondary PCI bus H 310 is closed. Further assume, that the master slot A0 304, residing on secondary PCI bus A 309, requests control over of PCI bus 204. As a result thereof, the GNT# signal for the current owner is deactivated (i.e. slot H0), and the adapter residing therein finishes any remaining transfers and relinquishes control of the bus 204. It should be noted, that arbitration as previously described normally occurs as a background operation while the current bus owner completes its transfers.

In this example, it can be furthered assumed, that the device residing in slot A0 304 on bus A 309 wins the arbitration. Consequently, the PCI bus 204 is granted to the device residing in slot A0 304 (i.e. the A0 304 GNT# signal is routed to the Control Bus Switch Logic 208). As a result of wining the arbitration, the Bus Switch Control Logic 208 realizes that the device adapter residing in slot A0 304 is being granted the PCI bus 204.

Consequently, the Bus Switch Control Logic 208 delays the routing of the GNT# signal to slot A0 304 until the in-line switches 302-N to the previous bus 204 owner are opened, and the switches to the new bus owner are closed, via the enablement or disablement of the appropriate SW Enables 316. The Bus Switch Control Logic 208 then routes the GNT# signal to the device residing in slot A0 304 on bus 309, which is then allowed to perform its operation.

In this example it can be further assumed that the Host Bridge 202 now desires to perform a transfer to a target device residing at slot B0 on bus B 308. As result thereof, Host Bridge 202 requests the PCI bus 204. As previously described it can be assumed that the Host Bridge 202 wins the arbitration cycle. As a result thereof, the device residing in slot A0 on bus A 309 detects the removal of its GNT# signal, and therefore, concludes it operation and proceeds to relinquish control of the bus 204. Address Decode Logic, residing in Control Logic 301, indicates-that the target to be selected resides in slot B0 on bus B 308. Consequently, an encoded set of signals on Target bus 314 are sent to the Bus Switch Control Logic 208 to indicate the secondary PCI bus the target resides on (i.e. 308). When the Host Bridge 202 is granted the bus, the Bus Switch Control Logic 208 first opens the switches 302-N to the previous owner (slot 1A0 304), closes the switches 302-N to the target on bus B 308, and then routes the GNT# signal back to the Host Bridge 202.

Figure 4:
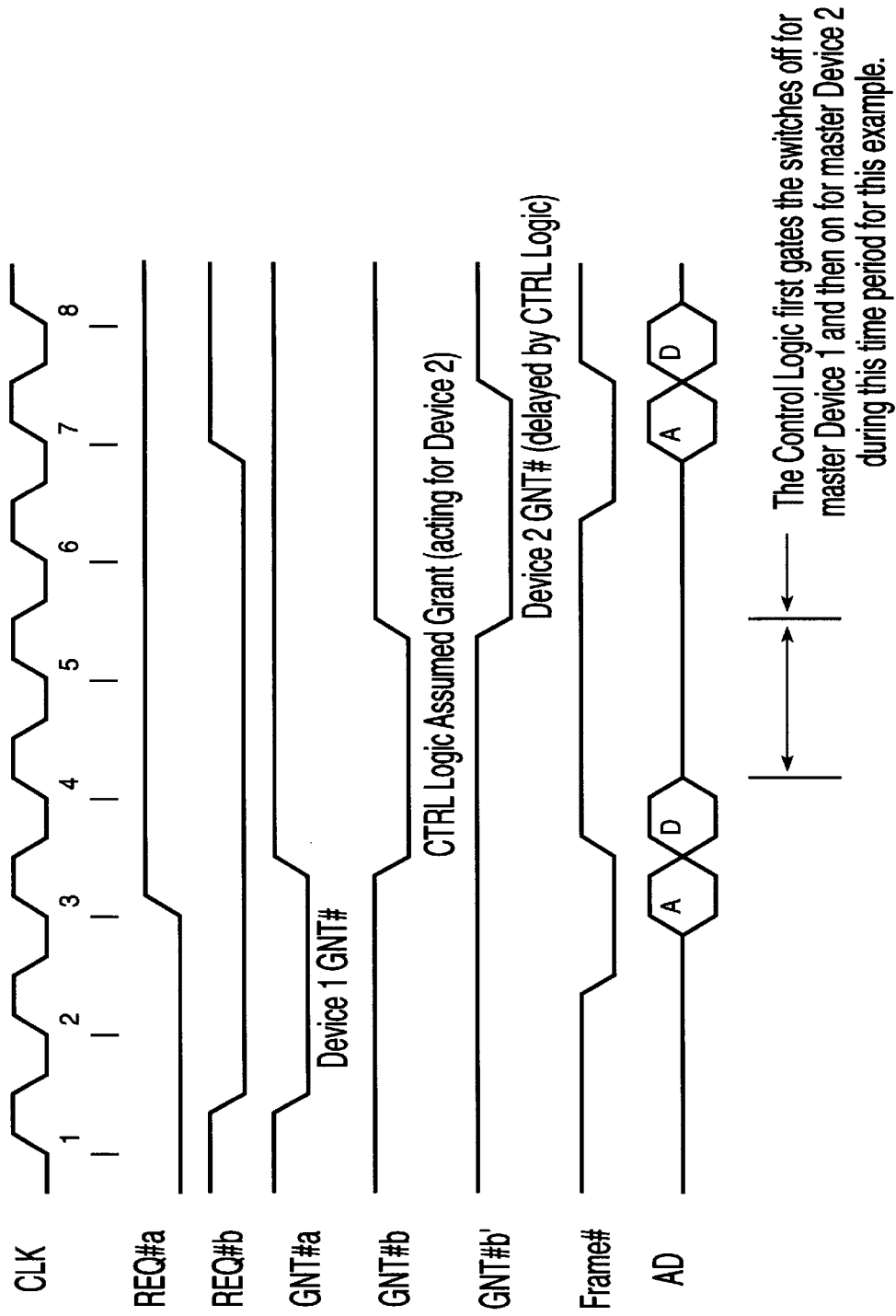
FIG. 4 is a timing sequence diagram illustrating an example of a set of timing sequences for the release and grant of the PCI bus of FIG. 3 according to the teachings of the present invention.

Reference now being made to FIG. 4, a timing sequence diagram is shown for illustrating an example of a set of timing sequences for the release and grant of the PCI bus 204 according to the teachings of the present invention. More specifically, the timing sequence illustrated in FIG. 4 shows an example in which the PCI bus 204 is being released by a first device (device 1), and granted to a second device (device 2). As previously, explained, the Bus Switch Control Logic 208 first gains momentary control over the PCI bus 204 on behalf of the new wining arbiter, in order to first open and close the appropriate in-line switches 302-n before routing the new GNT# signal to the new wining arbiter.

Current loading restrictions imposed by the PCI specification limit slots to a total of four. However, with the teachings of the present invention, theoretically, a total of 24 slots can be attached under one host bridge, while maintaining conformance to the loading requirements of the PCI specification for 33 MHz. It should also be noted that the present invention is equally applicable to a PCI bus operating at 66 MHz. Specifically, the loading restrictions for a 66 MHz limit the use of slots to a total of two. The teachings of the present invention, as applied to the PCI 66 MHz bus, should allow up to a maximum of four slots.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An apparatus for increasing the load capabilities of a bus, the apparatus comprising:

a primary bus;

a plurality of secondary buses;

an arbiter for receiving requests for control of the primary bus, and for selecting one of the requests as a master for the control;

a plurality of switches for establishing the physical connection from the primary bus to one of the secondary buses, and for removing the connection, each one of the switches including means for receiving a signal indicating whether to establish or remove the connection; and control logic means, coupled to the arbiter, for gaining control over the primary bus prior to granting control to the master, and for enabling and disabling each of the switches whereby the physical connection is either established or removed.

2. The apparatus of claim 1 wherein the control logic means includes:

means for transmitting, during control over the primary bus, an enable signal to the switches corresponding to the secondary buses desired to be connected to the primary bus.

3. The apparatus of claim 2 wherein the transmitting means includes:

means for transmitting, during control over the primary bus, a disable signal to the switches corresponding to the secondary buses desired to be removed from the primary bus.

4. The apparatus of claim 3 wherein the primary and secondary buses are Peripheral Component Interconnect buses.

5. A data processing system comprising:

a primary bus;

memory, coupled to the primary bus, for storing instructions;

input means, coupled to the primary bus, for receiving input from a user;

a central processing unit for executing the stored instructions;

a display for displaying the results of the executed instructions and the received input;

a plurality of secondary buses for connecting additional devices;

an arbiter for receiving requests for control of the primary bus, and for selecting one of the requests as a master for the control;

a plurality of switches for establishing the physical connection from the primary bus to one of the secondary buses, and for removing the connection, each one of the switches including means for receiving a signal indicating whether to establish or remove the connection; and control logic means, coupled to the arbiter, for gaining control over the primary bus prior to granting control to the master, and for enabling and disabling each of the switches whereby the physical connection is either established or removed.

6. The apparatus of claim 5 wherein the control logic means includes:

means for transmitting, during control over the primary bus, an enable signal to the switches corresponding to the secondary buses desired to be connected to the primary bus.

7. The apparatus of claim 6 wherein the transmitting means includes:

means for transmitting, during control over the primary bus, a disable signal to the switches corresponding to the secondary buses desired to be removed from the primary bus.

8. The apparatus of claim 7 wherein the primary and secondary buses are Peripheral Component Interconnect buses.

9. An apparatus for increasing the load capabilities of a bus, the apparatus comprising:

a primary Peripheral Component Interconnect bus;

a plurality of secondary Peripheral Component Interconnect buses;

a plurality of switches for connecting the primary Peripheral Component Interconnect bus to a corresponding one of the secondary Peripheral Component Interconnect buses, each one of the switches having an enable line for receiving a signal to enable or disable the switch;

an arbiter for receiving requests for control of the primary Peripheral Component Interconnect bus, and for selecting one of of the requests as a master for the control;

control logic means for enabling and disabling each of the switches, via the corresponding enable line, for connection or disconnection to the primary Peripheral Component Interconnect bus, the control logic means including:

means, coupled to the arbiter, for gaining control over the primary Peripheral Component Interconnect bus prior to granting control to the master; and means for transmitting, during control over the primary Peripheral Component Interconnect bus, an enable signal to the switches corresponding to the secondary buses desired to be connected to the primary Peripheral Component Interconnect bus.

10. A data processing system comprising:

a primary peripheral component interconnect bus;

memory, coupled to the primary bus, for storing instructions;

input means, coupled to the primary bus, for receiving input from a user;

a central processing unit for executing the stored instructions;

a display for displaying the results of the executed instuctions and the received input;

a plurality of secondary peripheral component interconnect buses for connecting additional devices;

a plurality of switches for connecting the primary Peripheral Component Interconnect bus to a corresponding one of the secondary Peripheral Component Interconnect buses, each one of the switches having an enable line for receiving a signal to enable or disable the switch;

an arbiter for receiving requests for control of the primary Peripheral Component Interconnect bus, and for selecting one of the requests as a master for the control;

control logic means for enabling and disabling each of the switches, via the corresponding enable line, for connection or disconnection to the primary Peripheral Component Interconnect bus, the control logic means including:

means, coupled to the arbiter, for gaining control over the primary Peripheral Component Interconnect bus prior to granting control to the master; and means for transmitting, during control over the primary Peripheral Component Interconnect bus, an enable signal to the switches corresponding to the secondary buses desired to be connected to the primary Peripheral Component Interconnect bus.

* * * * *